(12) United States Patent
Gilmore et al.

(10) Patent No.: US 12,129,902 B2
(45) Date of Patent: Oct. 29, 2024

(54) STACKED DISK SPRING VIBRATION ISOLATOR WITH INCREASED LATERAL LOAD CAPACITY

(71) Applicant: Toyota Motor Engineering & Manufacturing North America, Inc., Plano, TX (US)

(72) Inventors: Paul A Gilmore, Ann Arbor, MI (US); Umesh Gandhi, Farmington Hills, MI (US); Ryohei Tsuruta, Ann Arbor, MI (US); Brian J Pinkelman, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 92 days.

(21) Appl. No.: 17/205,944

(22) Filed: Mar. 18, 2021

(65) Prior Publication Data
US 2022/0299083 A1   Sep. 22, 2022

(51) Int. Cl.
  F16F 1/32    (2006.01)
  B60N 2/54    (2006.01)
  F16F 3/02    (2006.01)
  F16F 15/00   (2006.01)
  F16F 15/06   (2006.01)

(52) U.S. Cl.
  CPC ........... *F16F 1/32* (2013.01); *B60N 2/54* (2013.01); *F16F 3/02* (2013.01); *F16F 15/002* (2013.01); *F16F 15/06* (2013.01); *F16F 2228/004* (2013.01); *F16F 2228/063* (2013.01)

(58) Field of Classification Search
  CPC .... F16F 1/32; F16F 3/02; F16F 15/002; F16F 15/06; F16F 2228/004; F16F 2228/063; B60N 2/54
  See application file for complete search history.

(56) References Cited

U.S. PATENT DOCUMENTS

| | | | | |
|---|---|---|---|---|
| 2,121,835 A | * | 6/1938 | Sproul | B61F 5/122 267/207 |
| 3,107,905 A | * | 10/1963 | Lucas | F16F 1/32 248/200.1 |
| 3,394,631 A | | 7/1968 | Thompson | |

(Continued)

FOREIGN PATENT DOCUMENTS

| | | | |
|---|---|---|---|
| CN | 20920851 U | * | 8/2019 |
| DE | 3543176 C1 | * | 5/1987 |

(Continued)

*Primary Examiner* — Melody M Burch
(74) *Attorney, Agent, or Firm* — Haynes and Boone, LLP

(57) ABSTRACT

An apparatus includes at least two disk spring washers, at least one ring-shaped outer spacer coupled to the outer edges of one or two of the disk spring washers, and at least one ring-shaped inner spacer coupled to the inner edges of one or two of the disk spring washers. The apparatus also includes a central shaft concentric with the disk spring washers, the outer spacers, and the inner spacers. The apparatus also includes a bottom attachment portion coupled to the bottom of the central shaft to support the at least two disk spring washers, and a top attachment portion configured to slide vertically along the central shaft. The top attachment portion is configured to, with an application of a downward force, compress the at least two disk spring washers.

26 Claims, 12 Drawing Sheets

(56) References Cited

U.S. PATENT DOCUMENTS

| | | | | |
|---|---|---|---|---|
| 4,351,556 | A * | 9/1982 | Worringer | B60N 2/507 |
| | | | | 248/424 |
| 10,371,229 | B2 | 8/2019 | Gandhi et al. | |
| 10,677,310 | B2 | 6/2020 | Gandhi et al. | |
| 2007/0138720 | A1* | 6/2007 | Evans | F16F 1/32 |
| | | | | 267/162 |
| 2014/0151169 | A1* | 6/2014 | Wehr | F16F 9/52 |
| | | | | 188/269 |
| 2019/0186589 | A1 | 6/2019 | Gandhi et al. | |

FOREIGN PATENT DOCUMENTS

| | | | | |
|---|---|---|---|---|
| DE | 10155183 A1 * | 7/2003 | | E01C 3/06 |
| SU | 1174629 A1 * | 8/1985 | | |
| WO | WO-2018029919 A1 * | 2/2018 | | B60N 2/07 |

* cited by examiner

STACKED DISK SPRING VIBRATION ISOLATOR WITH INCREASED LATERAL LOAD CAPACITY

TECHNICAL FIELD

The subject matter described herein relates to a stacked disk vibration isolator with improved lateral stability. This stacked disk vibration isolator has particular but not exclusive utility for reducing seat vibration in cars, trucks, and vans.

BACKGROUND

Seats in a vehicle (e.g., a car, truck, or van) often include a frame, which attaches to a pair of sliding rails, which in turn are attached to the vehicle floor. To limit the transmission of vibration between the vehicle floor and the seat, vibration isolators may be placed between the sliding rails and the seat frame, or between the sliding rails and the floor. However, conventional linear spring isolators may still permit considerable transmission of vibration, or even amplification of vibration at frequencies close to the resonant frequency of the spring. To reduce vibration transmission along the longitudinal axis, of the isolator, a stacked disk isolator or quasi-zero-stiffness (QZS) isolator may be employed instead of a linear spring. Unfortunately, QZS isolators provide limited lateral stability, and may deform and/or transmit vibrations along directions orthogonal to the longitudinal axis of the isolator. A need therefore exists for isolators that reduce transmission of vertical vibration, while exhibiting improved lateral load capacity.

The information included in this Background section of the specification, including any references cited herein and any description or discussion thereof, is included for technical reference purposes only and is not to be regarded as subject matter by which the scope of the disclosure is to be bound.

SUMMARY

Disclosed is a stacked disk vibration isolator with improved lateral stability and lateral load capacity. The stacked disk vibration isolator includes a plurality of conically oriented, ring-shaped flexible disks, which are connected by inner spacers and outer spacers to form a spring stack. The disks may be held in place on the inner spacers by means of tabs. The spring stack may be compressed by a horizontal plate or vertically oriented plunger pressing downward from the top. When the plate or plunger is released, the spring stack returns to its uncompressed state. The spring stack includes a central shaft around which the plunger slides by means of a bushing be contained within a tubular enclosure. The spring stack may be located within a tubular enclosure. The central shaft and the tubular enclosure may be rigid or flexible. For example, the tubular enclosure may be a shrink-fit polymer film.

The stacked disk vibration isolator disclosed herein has particular, but not exclusive, utility for cars, trucks, and vans. One general aspect includes at least two disk spring washers, where each disk spring washer includes an inner edge, an outer edge, and a central opening; at least one ring-shaped outer spacer, where each outer spacer is coupled to the outer edges of one or two disk spring washers of the at least two disk spring washers; at least one ring-shaped inner spacer, where each inner spacer is coupled to the inner edges of one or two disk spring washers of the at least two disk spring washers; a central shaft concentric with the at least two disk spring washers, the at least one outer spacer, and the at least one inner spacer; a bottom attachment portion coupled to a lower end of the central shaft and configured to support the at least two disk spring washers; and a top attachment portion configured to slide vertically along the central shaft, where the top attachment portion is configured to, with an application of a downward force, compress the at least two disk spring washers.

In some embodiments, the central shaft is rigid. In some embodiments, the central shaft is flexible. In some embodiments, the top attachment portion includes a plunger. In some embodiments, the top attachment portion includes a plate or platform. In some embodiments, the bottom attachment portion includes a plate or platform. In some embodiments, the apparatus further includes at least one tab disposed on the at least one inner spacer and configured to retain at least one disk spring washer of the at least two disk spring washers against the at least one inner spacer. In some embodiments, the at least two disk spring washers, the at least one inner spacer, and the at least one outer spacer are positioned within the tubular enclosure. In some embodiments, the tubular enclosure is rigid. In some embodiments, either the tubular enclosure is flexible, at least one inner spacer is flexible, or at least one outer spacer is flexible. In some embodiments, the apparatus further includes a fluid encapsulated within the tubular enclosure.

One general aspect includes a vehicle. The vehicle includes a floor; a seat including, a backrest, a cushion, a frame, a slide rail configured to permit the seat to travel in a direction parallel to the floor; a vibration isolator including: at least two disk spring washers, where each disk spring washer includes an inner edge, an outer edge, and a central opening; at least one ring-shaped outer spacer, where each outer spacer is coupled to the outer edges of one or two disk spring washers of the at least two disk spring washers; at least one ring-shaped inner spacer, where each inner spacer is coupled to the inner edges of one or two disk spring washers of the at least two disk spring washers; a flexible central shaft concentric with the at least two disk spring washers, the at least one outer spacer, and the at least one inner spacer; a bottom attachment portion coupled to a lower end of the flexible central shaft and configured to support the at least two disk spring washers; and a top attachment portion configured to slide along the flexible central shaft, where the top attachment portion is configured to, with an application of a downward force, reversibly compress the at least two disk spring washers.

Implementations may include one or more of the following features. In some embodiments, the vibration isolator is positioned between the slide rail and the frame of the seat. In some embodiments, the vibration isolator is positioned between the slide rail and the floor. In some embodiments, the top attachment portion includes a plunger. In some embodiments, the top attachment portion or bottom attachment portion includes a plate or platform. In some embodiments, the vibration isolator further includes a rigid or flexible tubular enclosure longitudinally aligned with and concentric with the central shaft, where the at least two disk spring washers, the at least one inner spacer, and the at least one outer spacer are positioned within the tubular housing. In some embodiments, at least one inner spacer is flexible, at least one outer spacer is flexible, or a fluid is encapsulated within the tubular enclosure.

One general aspect includes a system. The system includes: a vehicle; a first component positioned within the vehicle; a second component positioned within the vehicle;

and a vibration isolator positioned between the first component and the second component. The vibration isolator includes: at least two disk spring washers, where each disk spring washer includes an inner edge, an outer edge, and a central opening; at least one ring-shaped outer spacer, where each outer spacer is coupled to the outer edges of one or two disk spring washers of the at least two disk spring washers; at least one ring-shaped inner spacer, where each inner spacer is coupled to the inner edges of one or two disk spring washers of the at least two disk spring washers; a flexible central shaft concentric with the at least two disk spring washers, the at least one outer spacer, and the at least one inner spacer; a bottom plate or platform coupled to a lower end of the flexible central shaft and configured to support the at least two disk spring washers; and a top plate, platform, or plunger configured to slide along the flexible central shaft. The top plate, platform, or plunger is configured to, with an application of a downward force, reversibly compress the at least two disk spring washers.

In some embodiments, the vibration isolator further includes a rigid or flexible tubular enclosure longitudinally aligned with and concentric with the central shaft, where the at least two disk spring washers, the at least one inner spacer, and the at least one outer spacer are positioned within the tubular housing.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the stacked disk vibration isolator, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
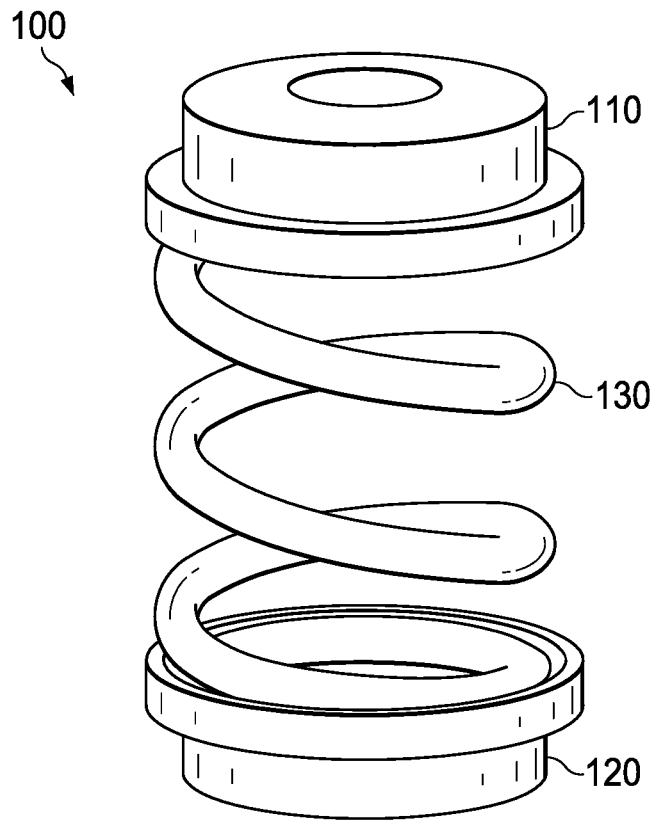
FIG. 1 is an exemplary representation of a conventional linear spring isolator, according to aspects of the present disclosure.

For applications such as reducing the vibration of vehicle seats, quasi-zero-stiffness (QZS) isolators may be used in place of linear spring isolators. A QZS isolator, also known as a stacked disk isolator, stacked disk spring, Belleville washer isolator, or Belleville washer spring, includes a compression range wherein additional deflection of the isolator does not result in significant additional upward force from the spring stack. Alternatively, it can be said that over this compression range, additional downward forces on the QZS isolator produce disproportionate deflections (e.g., quasi-zero stiffness), whereas outside this range additional force results in smaller deflections (e.g., the spring stack is stiff). Unfortunately, existing QZS isolators provide limited lateral stability and lateral load capacity, and may therefore deform or buckle under lateral force loads, and thus transmit vibrations along directions parallel and/or orthogonal to the longitudinal axis of the isolator.

In accordance with at least one embodiment of the present disclosure, a stacked disk vibration isolator (e.g., a passenger seat) is disclosed which provides improved lateral stability and lateral load capacity. The stacked disk vibration isolator includes a plurality of conically oriented, ring-shaped flexible disks (also known as Belleville washers), which are connected by inner spacers and outer spacers to form a spring stack. The disks may be held in place on the inner spacers by means of tabs. The spring stack may be reversibly compressed by a horizontal plate or vertically oriented plunger pressing downward from the top. When the plate or plunger is released, the spring stack returns to its uncompressed state. The spring stack may be contained within a tubular enclosure, which may be a rigid tube, with interior surface smoothed, and includes a central shaft around which the plunger slides by means of a bushing or linear bearing. The central shaft and the tubular enclosure may be rigid or flexible. For example, the central shaft and tubular enclosure may both be made of metal. Alternatively, the central shaft may be made of rubber, and the tubular enclosure may be made of rubber or a shrink-fit polymer film. In some embodiments, the tubular enclosure may be filled with a viscous fluid to tune the characteristics of the QZS vibration isolator's force/deflection curve.

The proposed arrangement will help improve the lateral load carrying capabilities of stacked disk spring (Belleville washer) isolators or QZS isolators. This design provides an improvement over existing vehicle seats because it permits a range of vertical deflections over which no significant upward forces are generated, while also providing improved lateral stability and load capacity and thus less tendency to buckle under lateral forces. The result is less transmission of vibration between the vehicle floor and the seat, and thus a smoother ride for passengers.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes only, and should not be considered to limit the scope of the stacked disk vibration isolator. Certain features may be added, removed, or modified without departing from the spirit of the claimed subject matter.

FIG. 1 is an exemplary representation of a conventional linear spring isolator 100, according to aspects of the present disclosure. The linear spring isolator 100 includes a top attachment portion 110 and bottom attachment portion 120, separated by a spring 130. The spring 130 may for example be a metallic spring which deflects (e.g., compresses or stretches) in a manner that is approximately linearly correlated to the amount of vertical force placed on the isolator 100. In an example, the linear spring isolator 100 may be placed between a vehicle seat and the vehicle floor, in an attempt to limit transmission of vibrations from the floor to the seat. In such a use case, the top attachment portion 110 may for example be bolted to the seat frame, while the bottom attachment portion 120 may for example be bolted to the vehicle floor, or to the top of a slide rail to which the seat is mounted. Such undamped linear spring isolators 100 provide limited vibration isolation and limited lateral stability and lateral load capacity.

Figure 2A:
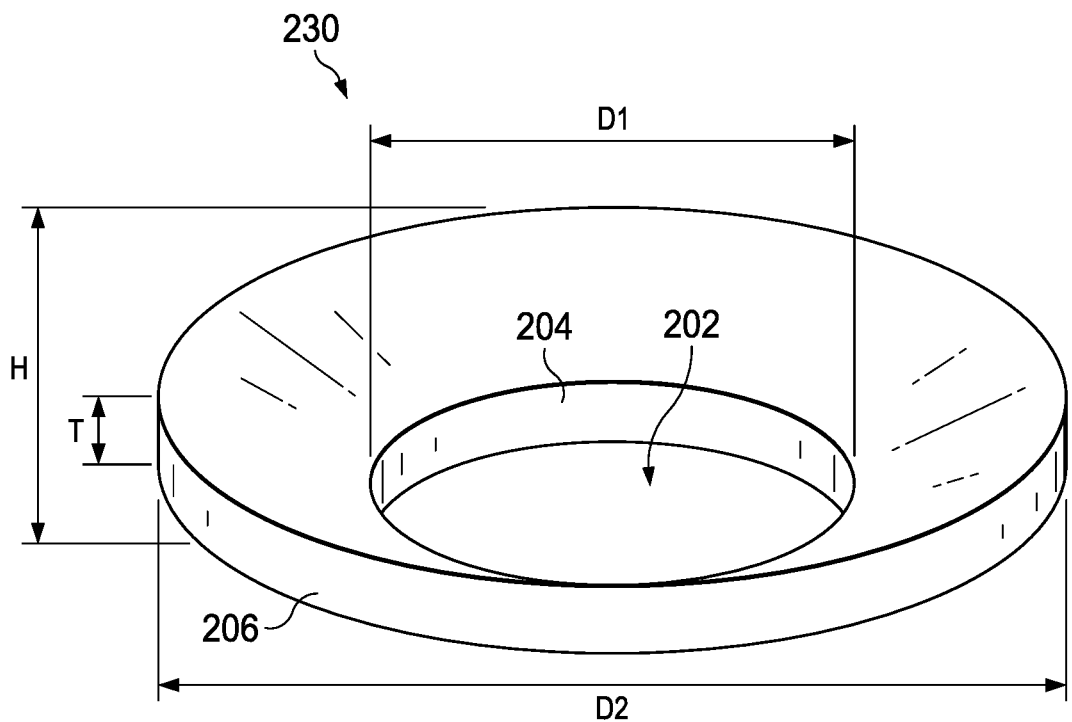
FIG. 2A is a perspective view of a ring-shaped or cone-shaped disk, Belleville washer, disk spring washer, in accordance with aspects of the present disclosure.

FIG. 2A is a perspective view of a ring-shaped or cone-shaped disk 230, in also known as a Belleville washer or disk spring washer, in accordance with aspects of the present disclosure. The disk 230 may for example be made of rubber, or another elastic material capable of flexing and then returning to its original shape. The conical shape of the disk is formed because the inner edge 204 and the outer edge 206 of the disk 230 are separated vertically by a height H. The inner edge 204 forms a central opening 202 with a diameter D1, while the outer edge 206 of the disk 230 has a diameter D2. The material forming the spring disk or washer 230 has a thickness T.

Figure 2B:
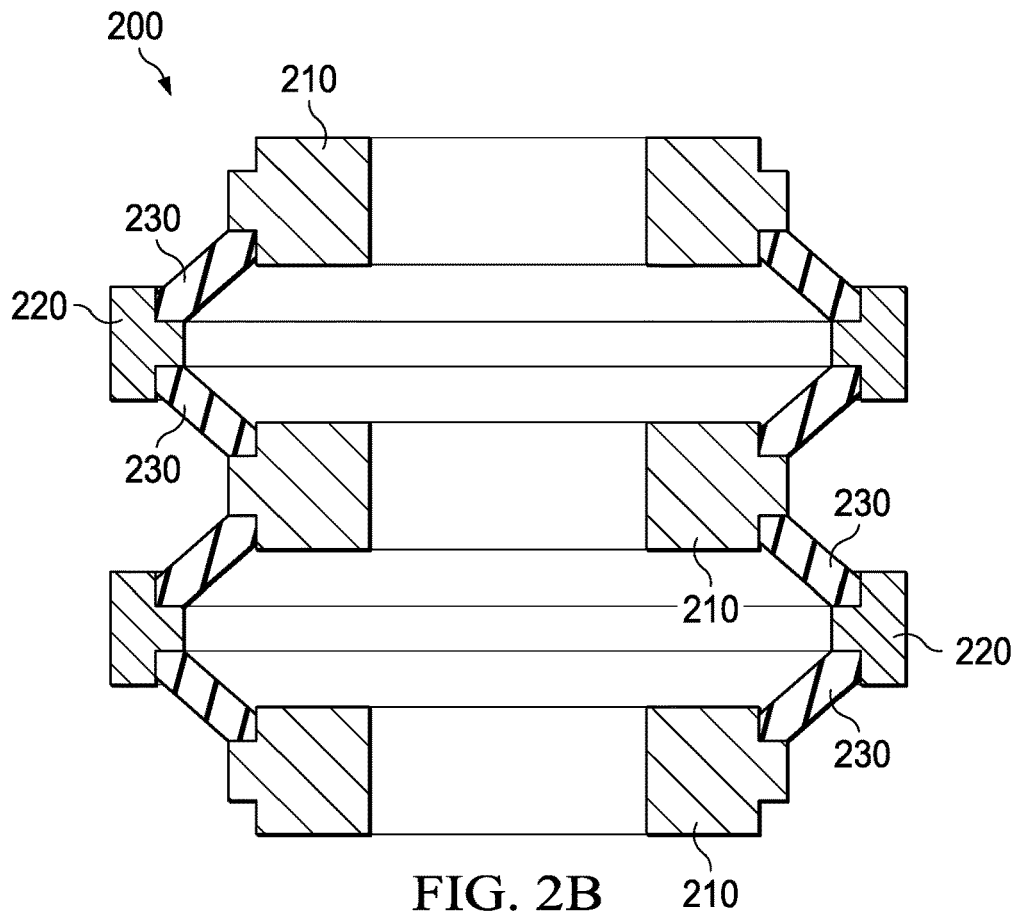
FIG. 2B is a side cross-sectional view of an exemplary stacked disk vibration isolator or QZS isolator, in accordance with aspects of the present disclosure.

FIG. 2B is a side cross-sectional view of an exemplary stacked disk vibration isolator or QZS isolator 200, in accordance with aspects of the present disclosure. The stacked disk vibration isolator or QZS isolator 200 includes a plurality of ring-shaped or cone-shaped rubber disks 230, also known as Belleville washers, disk spring washers, or spring disk washers. The disks 230 are separated by inner spacers 210 coupled to the inner edge of each spring disk washer 230 or each pair of spring disk washers 230. The spring disk washers 230 are also separated by outer spacers 220 coupled to the outer edge of each spring disk washer 230. The disks or Belleville washers 230 are stacked such that if two disks 230 are vertically adjacent to one another, then either their two outer edges 206 (See FIG. 1A) are coupled to the same outer spacer 220, or their inner edges 204 (See FIG. 1A) are coupled to the same inner spacer 210. Thus, the stack of disks or washers 230 forms a bellows shape that is capable of compressing vertically and then returning to its original shape.

The stacked disk vibration isolator 200 may include either an even or an odd number of spring disk washers 230. The spring disk washers 230 may be coupled to the spacers 210 and 220 by means of a friction fit or adhesive coupling, either or both of which may involve grooves, slots, or indentations in either the spacers 210, 220 or the spring disk washers 230, or any combination thereof.

Figure 2C:
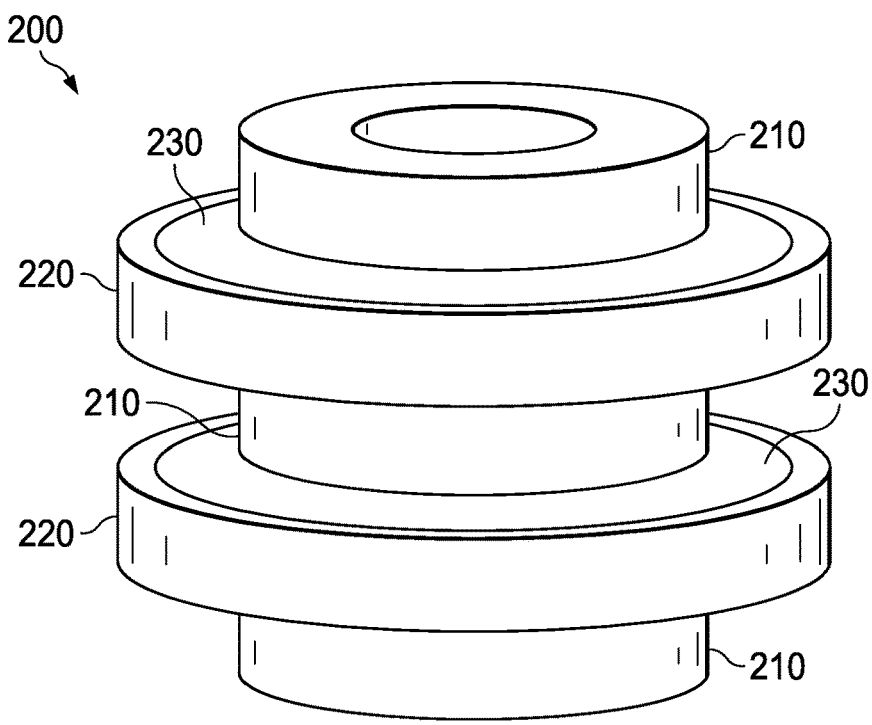
FIG. 2C is a perspective view of an exemplary stacked disk vibration isolator, in accordance with aspects of the present disclosure.

FIG. 2C is a perspective view of an exemplary stacked disk vibration isolator 200, in accordance with aspects of the present disclosure. Visible are the inner spacers 210, outer spacers 220, and disk spring washers 230.

Figure 3:
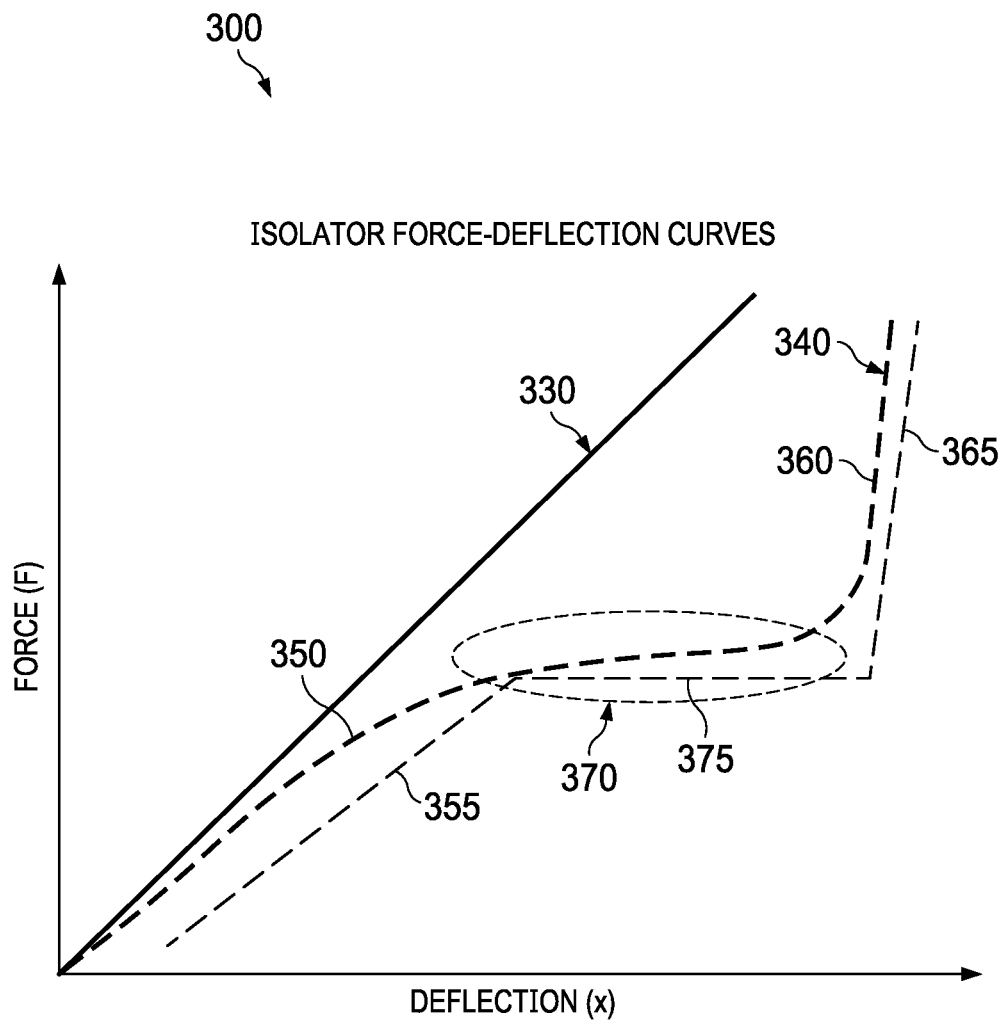
FIG. 3 shows a performance graph of an example linear spring isolator and an example QZS isolator, in accordance with aspects of the present disclosure.

FIG. 3 shows a performance graph 300 of an example linear spring isolator 330 and an example QZS isolator 340, in accordance with aspects of the present disclosure. The linear spring isolator curve 330 exhibits a linear or approximately linear relationship between an applied force F and a resulting deflection x of the spring. The slope of this line is the spring constant k of the spring, such that F=kx. The QZS isolator curve 340 exhibits a more complex relationship between the vertical force F placed on it and the resulting vertical deflection or compression x. This force-deflection relationship includes a first approximately linear region 350 and a second approximately linear region 360, separated by a quasi-zero-stiffness (QZS) region 370. Thus, the force-deflection relationship can be approximated as three straight line segments 355, 365, and 375.

Within the first approximately linear region 350, the slope of the curve 340 may be approximated as $F=k_1 x$, yielding the first line segment 355. For the QZS region, the slope can be approximated as zero, yielding the second line segment 375. For the second approximately linear region 360, the slope of the curve 340 Ny be approximated as $F=K_2 x$, yielding the third line segment 365.

In the quasi zero stiffness region 365 of the QZS isolator curve 340, small increases in downward force F on the QZS isolator result in disproportionately large increases in the deflection x or, alternatively, it can be said that large changes in the deflection x do not result in significant changes in the upward force F delivered by the isolator. As shown below, this force-deflection relationship 340 makes the QZS isolator more effective than the linear spring at damping or isolating vibrations.

Figure 4:
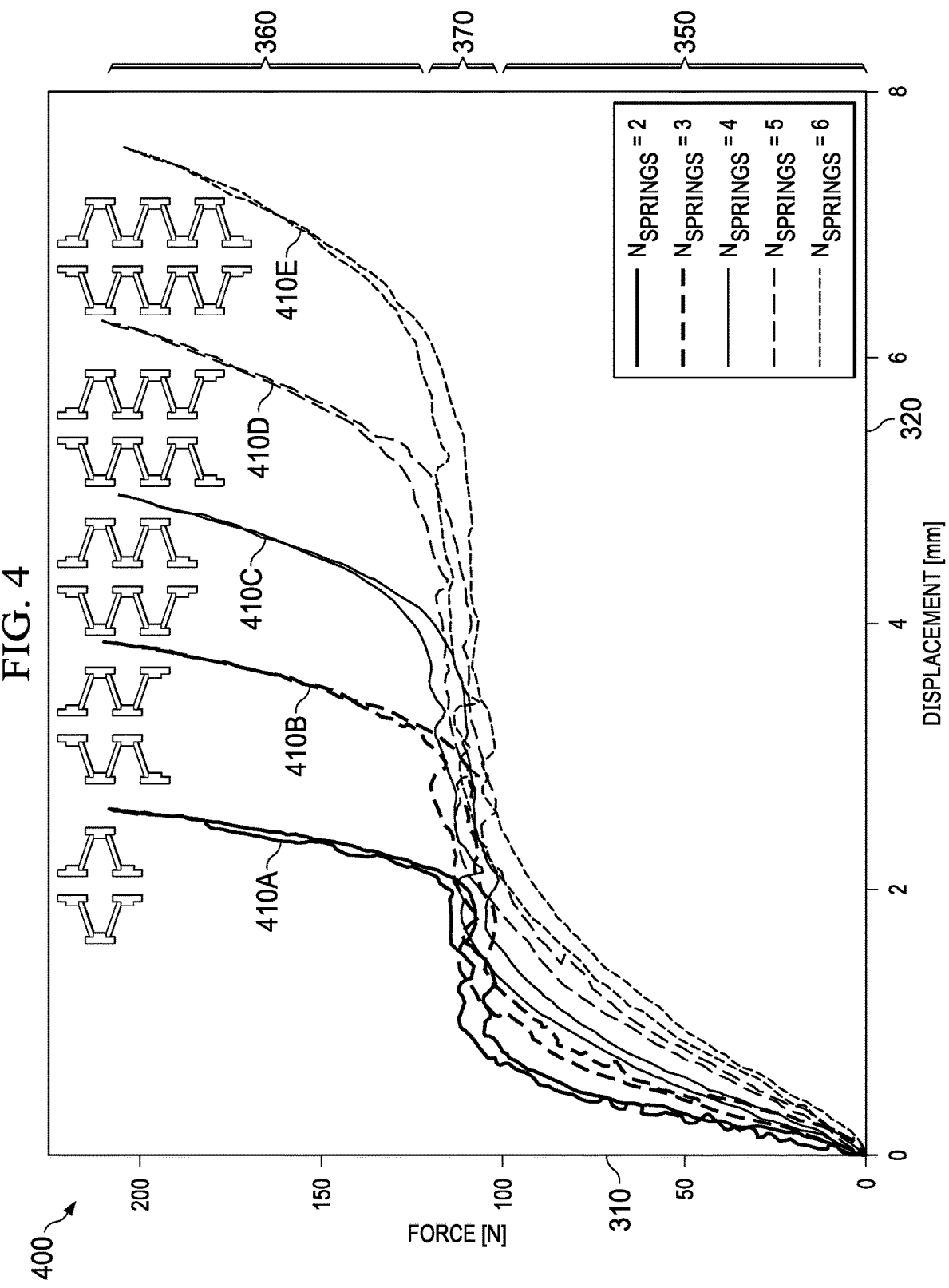
FIG. 4 is a performance graph showing the relationship between force and displacement for five different example QZS isolators, in accordance with aspects of the present disclosure.

FIG. 4 is a performance graph 400 showing the relationship between force 310 and displacement 320 for five different example QZS isolators: 410A (with two disk spring washers), 410B (with three disk spring washers), 410C (with four disk spring washers), 410D (with five disk spring washers), and 410E (with six disk soring washers), in accordance with aspects of the present disclosure. As shown in FIG. 3, the force-displacement curve for each QZS isolator includes a first approximately linear region 350, a quasi zero stiffness (QZS) region 370, and a second approximately linear region 360. As can be seen in the graph 400, the width or displacement range of the QZS region 370 (e.g. the number of millimeters of displacement permitted within the QZS region) increases with the number of disk spring washers, such that QZS isolator 410A, with two disk spring washers, has a QZS region approximately 1 mm wide, whereas QZS isolator 410E, with six disk spring washers, has a QZS region approximately 4 mm wide. Thus, QZS isolators with more disk spring washers are more capable of absorbing movement at the bottom of the isolator (e.g., movement of a vehicle floor) without transferring it to the top of the isolator (e.g., to the bottom of a vehicle seat). However, QZS isolators with more disk spring washers must be correspondingly taller, which may limit the places they will fit and the applications for which they may be used. Taller QZS isolators will also tend to cost more, as they require more materials, and they may exhibit less lateral stability and less lateral load capacity than shorter QZS isolators. Thus, taller QZS isolators may have a greater tendency to buckle under lateral loads. In this buckled state, the QZS vibration isolator may be substantially less effective at isolating vibrations, both in longitudinal and lateral directions.

Figure 5A:
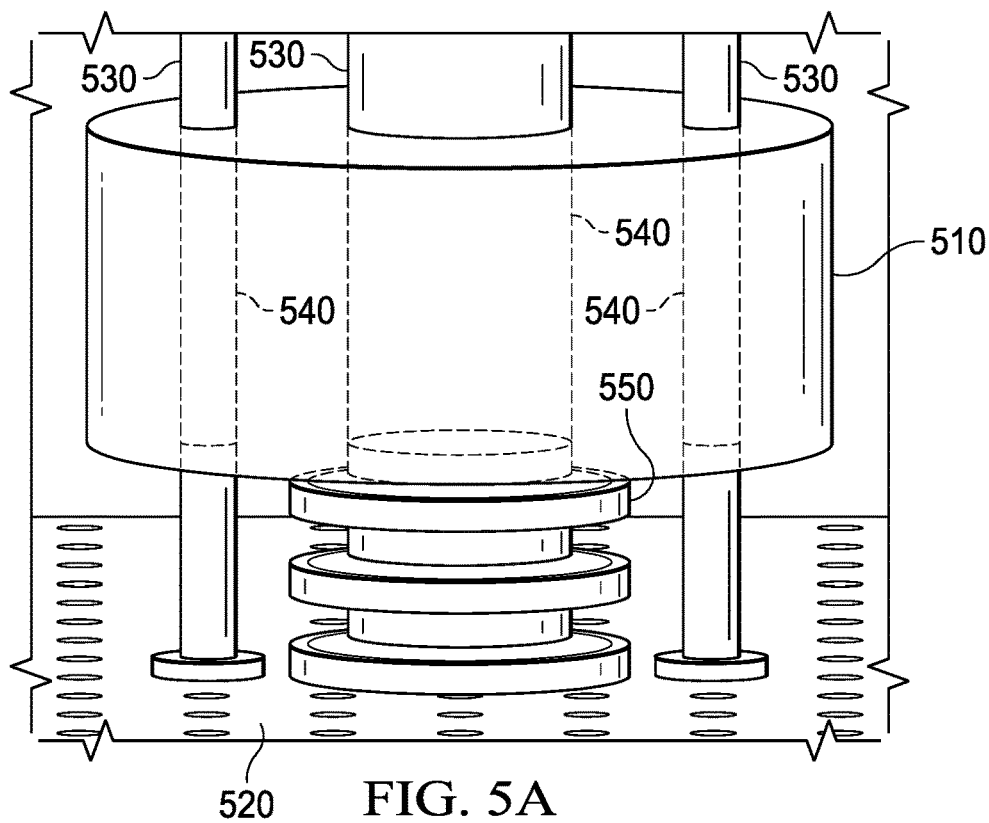
FIG. 5A is a perspective view of an example one-dimensional (1D) stacked disk vibration isolator measurement apparatus, in accordance with aspects of the present disclosure.

FIG. 5A is a perspective view of an example one-dimensional (1D) stacked disk vibration isolator measurement apparatus, in accordance with aspects of the present disclosure. Visible are a test mass 510 mounted to a shaker table 520 by a vibration isolator 550. For lateral and rotational stability during 1D vibration testing, the test mass 510 includes three tubular channels 540 through which three shafts 530 pass.

Figure 5B:
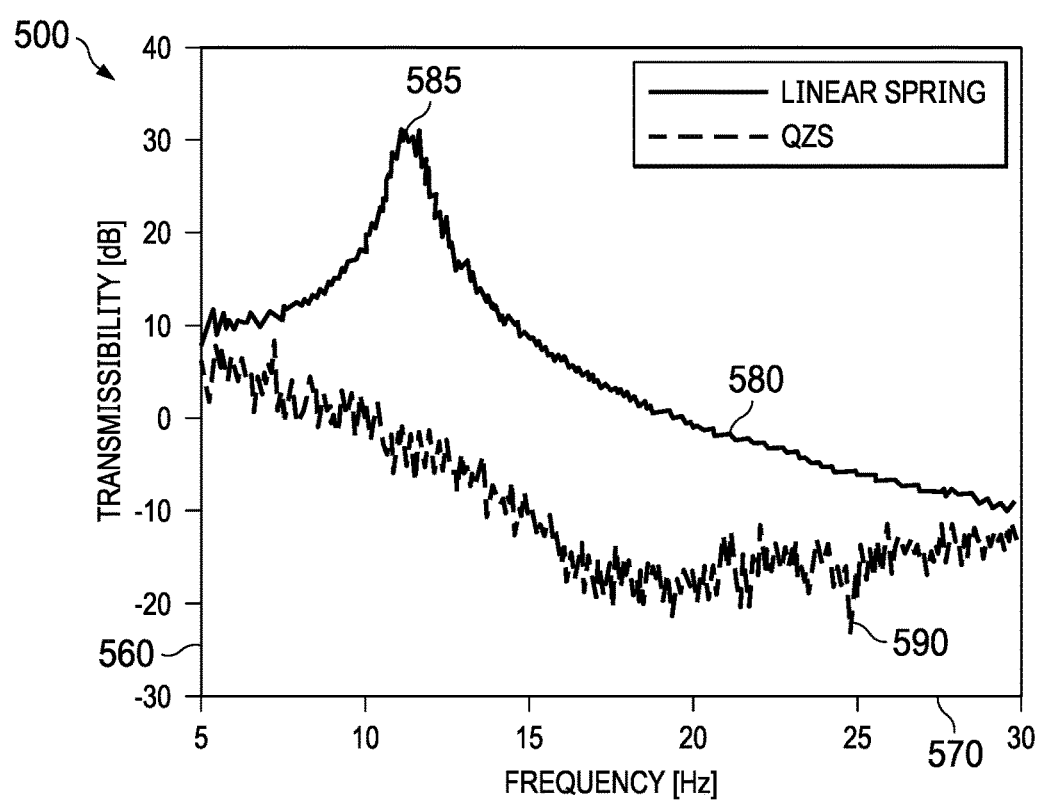
FIG. 5B is a performance graph showing the 1D vibration suppression performance of two different types of isolators, in accordance with aspects of the present disclosure.

FIG. 5B is a performance graph 500 showing the 1D vibration suppression performance of two different types of isolators in the test apparatus of FIG. 5A, in accordance with aspects of the present disclosure. The graph 500 shows curves of transmissibility 560 (measured for example in decibels or dB) vs. frequency 570 (measured for example in Hertz or Hz), for a linear spring isolator 580 and a QZS isolator 590. This represents, for example, the extent to which vertical vibrations of the shaker table 520 (See FIG. 5A) are translated into vertical vibrations of the test mass 510 (see FIG. 5A). A transmissibility of zero dB may represent perfect transmission of the vibrations through the isolator 550 (see FIG. 5A), such that a vibration of the shaker table causes an equal vibration of the test mass at that particular frequency. A transmissibility greater than 0 dB may represent amplification by the isolator, such that a vibration of the shaker table results in a larger or more powerful vibration of the test mass at that particular frequency. A transmissibility smaller than 0 dB may represent dampening of vibrations by the isolator, such that a vibration of the shaker table results in a smaller or less powerful vibration of the test mass at that particular frequency. In general, values less than 0 dB are desirable at all frequencies, and especially at higher frequencies.

As can be seen, the linear spring isolator curve 580 exhibits a sharp peak 585 at approximately 12 Hz, possibly representing a resonant frequency of the spring, and thus causing transmissibility in excess of +30 dB (e.g., 100 times more vibration than is observed at 5 Hz and 15 Hz). The linear spring isolator curve does not fall below 0 dB until the frequency of vibration exceeds 20 Hz. By contrast, the QZS isolator curve 590 does not exhibit any sharp peaks, and it drops below 0 dB at a vibration frequency of approximately 10 Hz, and remains below zero for the remainder of the curve. The QZS isolator curve 590 is also lower at all points than the linear spring isolator curve 580, indicating that the QZS isolator is better at suppressing vertical vibrations (or, alternatively, worse at transmitting such vibrations) than the linear spring isolator.

Figure 6A:
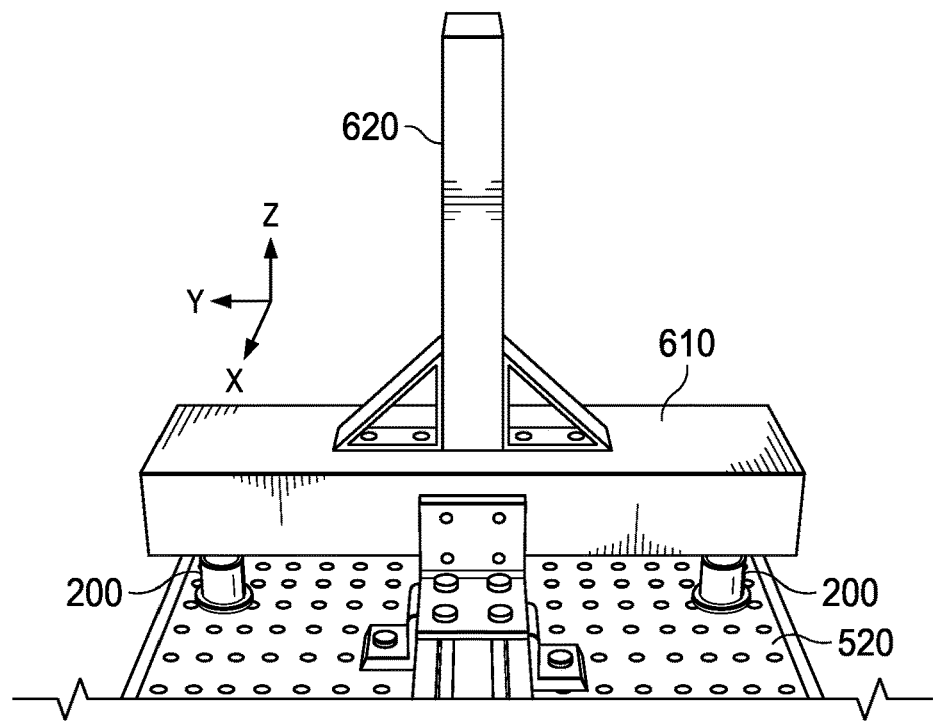
FIG. 6A is a perspective view of an example two-dimensional (2D) stacked disk vibration isolator measurement apparatus, in accordance with aspects of the present disclosure.

FIG. 6A is a perspective view of an example two-dimensional (2D) stacked disk vibration isolator measurement apparatus, in accordance with aspects of the present disclosure. Visible are a vertical test mass 620 fixedly mounted to a horizontal test mass 610, which in turn is mounted to a shaker table 520 by a pair of QZS vibration isolators 200. The effectiveness of the QZS isolators 200 may be assessed for example by measuring the vibration at the top of the vertical test mass 620, and comparing it to vibrations measured at the surface of the shaker table 520. Vibration of the shaker table 520 can result in rocking of the test masses 610 and 620, resulting in torques and lateral forces on the QZS isolators.

Figure 6B:
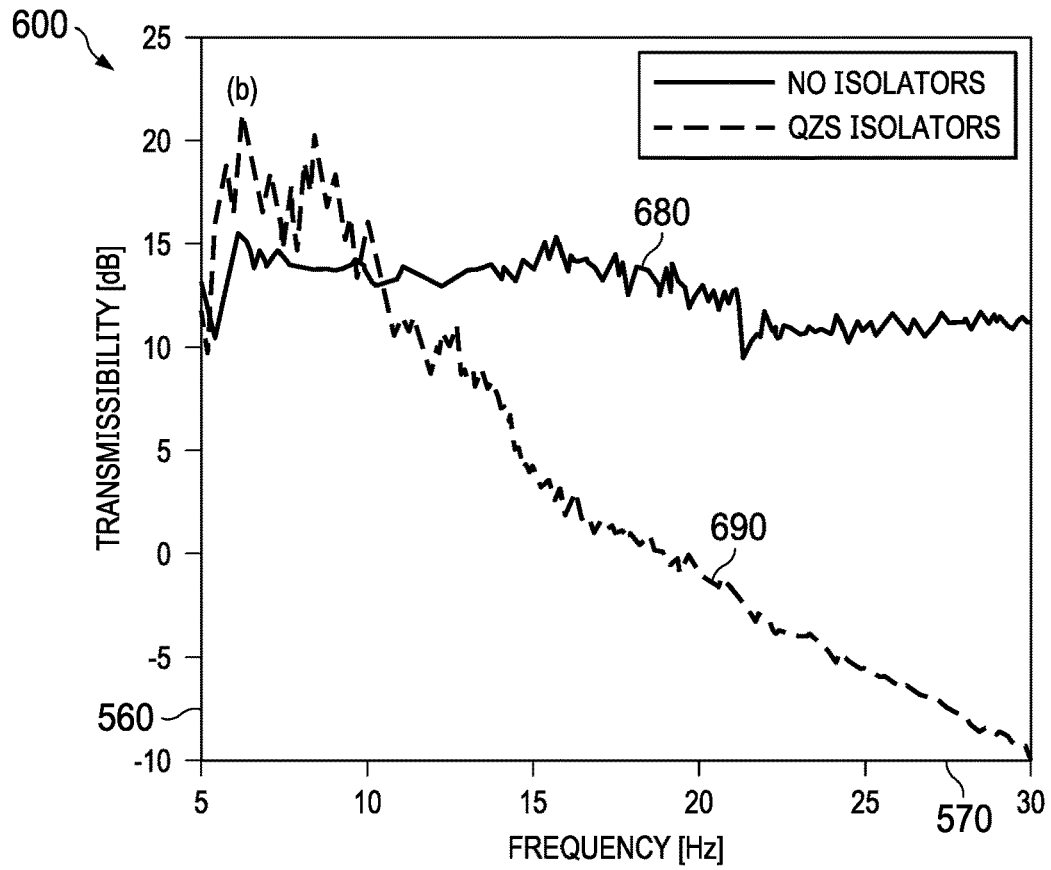
FIG. 6B is a performance graph showing the vibration suppression performance a QZS isolator, in accordance with aspects of the present disclosure.

FIG. 6B is a performance graph 600 showing the vibration suppression performance the QZS isolators in the test apparatus of FIG. 6A, in accordance with aspects of the present disclosure. The graph 600 shows curves of transmissibility 560 (measured for example in decibels or dB) vs. frequency 570 (measured for example in Hertz or Hz), for a non-isolated mass 680 and a QZS isolated mass 690. This represents, for example, the extent to which vertical vibrations of the shaker table 520 (See FIG. 6A) are translated into vertical and horizontal vibrations of the top of the vertical test mass 620 (see FIG. 6A), e.g. through lateral rocking of the lower test mass due to uneven compression of the QZS isolators 200. A transmissibility of zero dB may represent perfect transmission of the vibrations through the QZS isolators 200 (see FIG. 6A), such that a vibration of the shaker table causes an equal vibration of the top of the vertical mass at that particular frequency. A transmissibility greater than 0 dB may represent amplification by the isolators and/or the test masses, such that a vibration of the shaker table results in a larger or more powerful vibration of the top of the vertical test mass at that particular frequency. A transmissibility smaller than 0 dB may represent dampening of vibrations by the isolators, such that a vibration of the shaker table results in a smaller or less powerful vibration of the top of the vertical test mass at that particular frequency. In general, values less than 0 dB are desirable at all frequencies, and especially at higher frequencies.

As can be seen, when the test masses are mounted directly to the shaker table with no vibration isolation, as represented by curve 680, the test masses amplify the vibrations of the shaker table by 10-15 dB across all measured frequencies. The QZS-isolated curve 690 shows an even greater amplification of 15-20 dB between 5 Hz and 10 Hz. However, the amplification is less than that of curve 680 at all measured frequencies above 10 Hz, and is less than zero (indicating a net damping of vibrations) at all measured frequencies higher than 20 Hz. This demonstrates that QZS isolators are effective at reducing vibrations of a 2D shaking apparatus.

It is noted that 2D vibrations can induce lateral forces on the QZS isolators. It is further noted that standard QZS isolators, as shown for example in FIGS. 2B and 2C, have low lateral load capacities and are thus prone to buckling when presented with high lateral loads. Thus, realistic use cases involving strong 2D and 3D vibration (as may be found for example on the floor of a vehicle, and in seats attached to the floor—especially for off-road vehicles) may be challenging for standard QZS isolators to withstand without buckling. Thus, as noted above, a need exists for QZS isolators with improved lateral load capacity.

Figure 7:
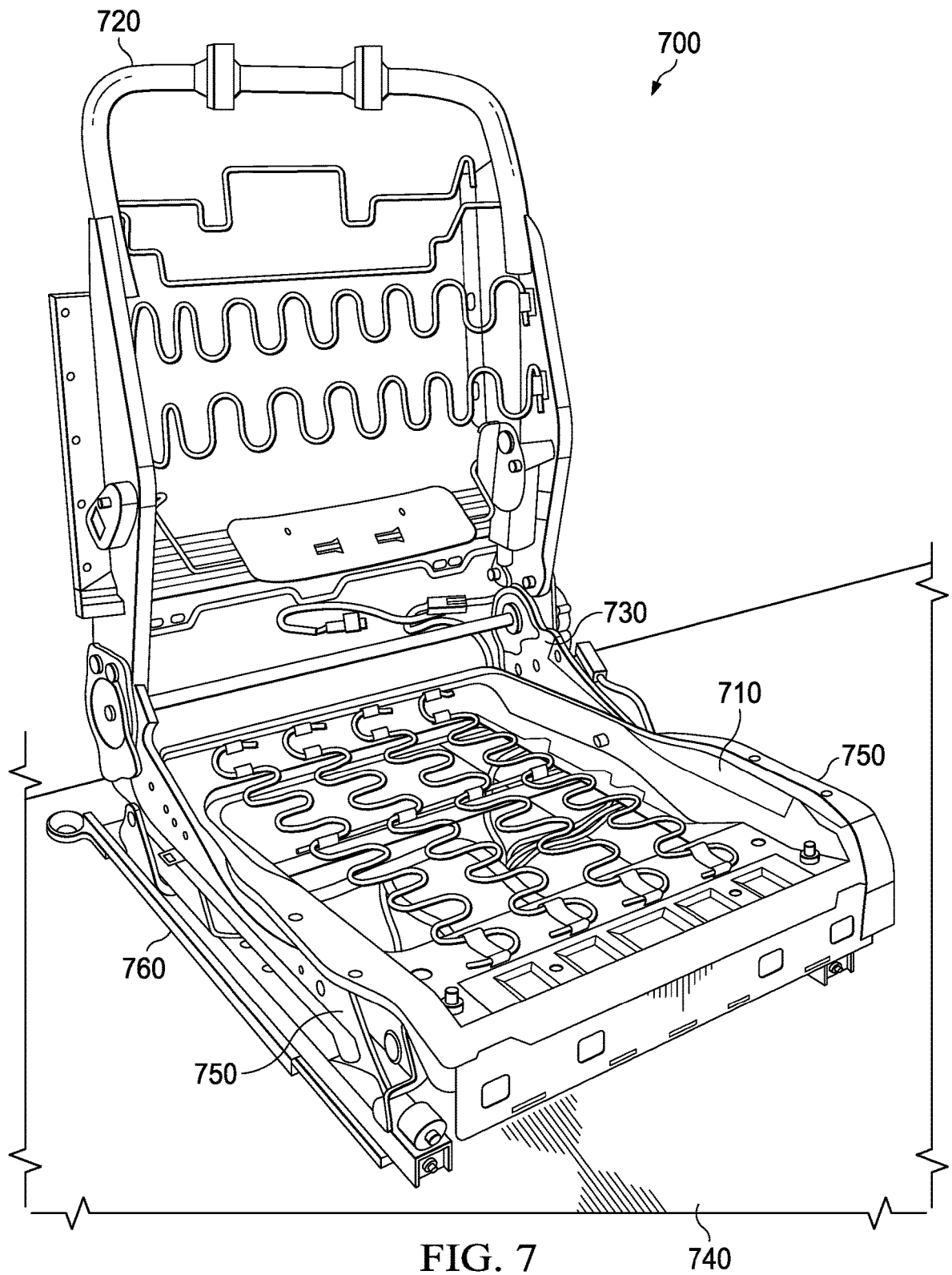
FIG. 7 is a perspective view of a vehicle seat with its wiring, cushioning, and upholstery removed, in accordance with aspects of the present disclosure.

FIG. 7 is a perspective view of a vehicle seat 700 with its wiring, cushioning, and upholstery removed, in accordance with aspects of the present disclosure. The vehicle seat 700 includes a seat pan or seat cushion pan 710, a seat back or seat back frame 720, and a recliner apparatus 730 to adjust the angle between the seat pan 710 and the seat back 720. The seat 700 also includes a seat frame 750, which attaches to the vehicle floor 740 by means of two slide rails 760, which permit the seat 700 to slide backward and forward with respect to the floor 740.

Figure 8A:
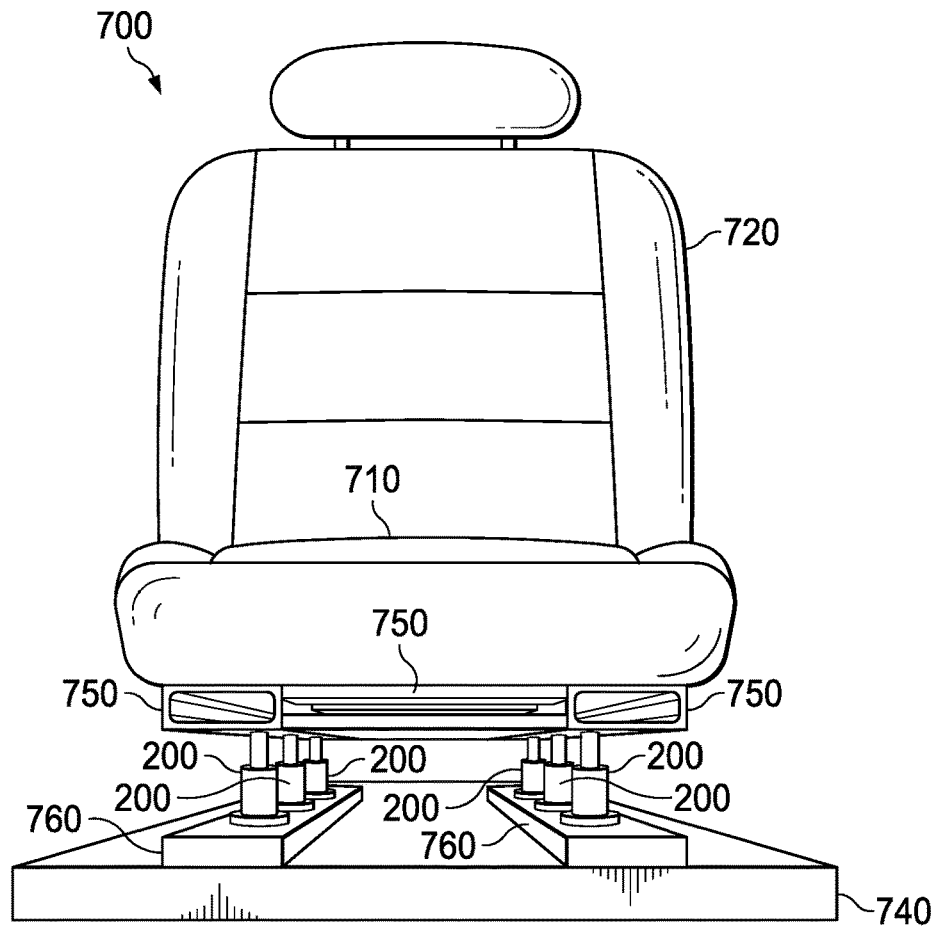
FIG. 8A is a perspective view of a vehicle seat, in accordance with aspects of the present disclosure.

FIG. 8A is a perspective view of a vehicle seat 700, in accordance with aspects of the present disclosure. The vehicle seat 700 includes a seat back 720 coupled to a seat pan 710, which is coupled to the seat frame 750. The seat frame 750 is coupled to a plurality of QZS vibration isolators 200, which are in turn coupled to the slide rails 760, which are coupled to the vehicle floor. Coupling may for example be through welds, bolts, screws, rivets, solder, adhesive, or other means known in the art. The QZS isolators 200 are configured to reduce transmission of vibration between the vehicle floor 740 and the seat 700.

Figure 8B:
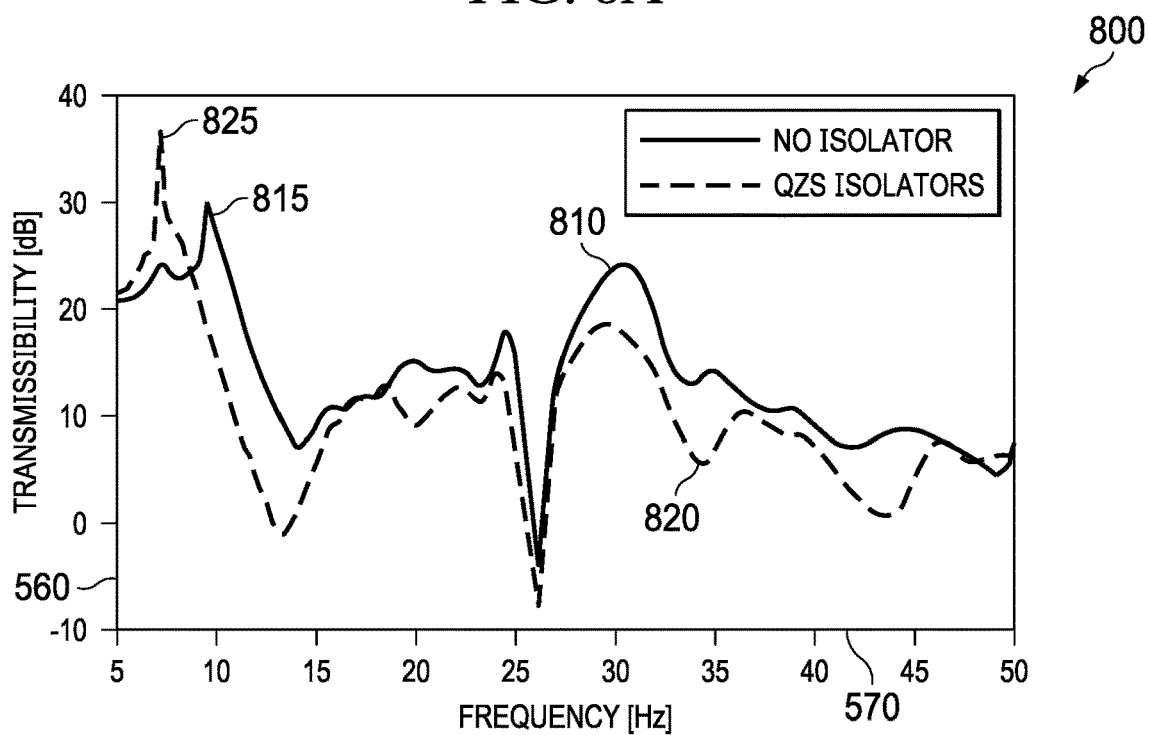
FIG. 8B is a performance graph showing the vibration suppression performance QZS isolators, in accordance with aspects of the present disclosure.

FIG. 8B is a performance graph 800 showing the vibration suppression performance of the QZS isolators 200 of FIG. 8A, in accordance with aspects of the present disclosure. The graph 800 shows curves of transmissibility 560 (measured for example in decibels or dB) vs. frequency 570 (measured for example in Hertz or Hz), for a non-isolated seat 810 and a QZS-isolated seat 820. This represents, for example, the extent to which vibrations of the floor 740 (see FIG. 8A) are translated into vibrations of the top of the seat back 720 (see FIG. 8A), e.g. through lateral rocking of the lower test mass due to uneven compression of the QZS isolators 200 (see FIG. 8A). A transmissibility of zero dB may represent perfect transmission of the vibrations through the QZS isolators 200 (see FIG. 6A), such that a vibration of the floor causes an equal vibration of the top of the seat back at that particular frequency. A transmissibility greater than 0 dB may represent amplification by the seat structure and/or the isolators, such that a vibration of the floor results in a larger or more powerful vibration of the top of the seat at that particular frequency. A transmissibility smaller than 0 dB may represent dampening of vibrations by the isolators, such that a vibration of the floor results in a smaller or less powerful vibration of the top of the seat back at that particular frequency. In general, values less than 0 dB are desirable at all frequencies, and especially at higher frequencies.

As can be seen, both the QZS-isolated curve 820 and the non-isolated curve 810 exhibit amplification spikes at low frequency. The spike 815 of the non-isolated curve 810 occurs at 10 Hz and has a maximum value of approximately 30 dB. The spike 825 of the QZS-isolated curve 820 is actually larger than the spike 815 of curve 810, indicating greater amplification of the floor's vibrations, with a peak value of roughly 37 dB. However, this spike occurs at a lower frequency—7 Hz for spike 825 vs. 10 Hz for spike 815, and may therefore result in less overall discomfort to a user sitting in the seat. Notably, the QZS-isolated curve 820 is lower than the non-isolated curve 810 at most measured frequencies between 9 Hz and 47 Hz, by as much as 10 dB (e.g., one tenth as much vibration transmission). The QZS-isolated curve 820 is approximately equal to the non-isolated curve 810 at 17 Hz and at 47-50 Hz. The total area under curve 820 is significantly less than the total area under curve 810, indicating less overall vibration transmissibility between the vehicle floor and the top of the seat back. Thus, a person of ordinary skill in the art will appreciate that QZS isolators may be effective at reducing the vibrations of a vehicle seat, and will generally result in a more comfortable ride for an occupant of the seat.

It is noted that vibrations of the vehicle floor and/or vehicle seat can induce lateral forces on the QZS isolators, which may in some cases cause them to buckle. As noted above, a need exists for QZS isolators with improved lateral load capacity.

Figure 9:
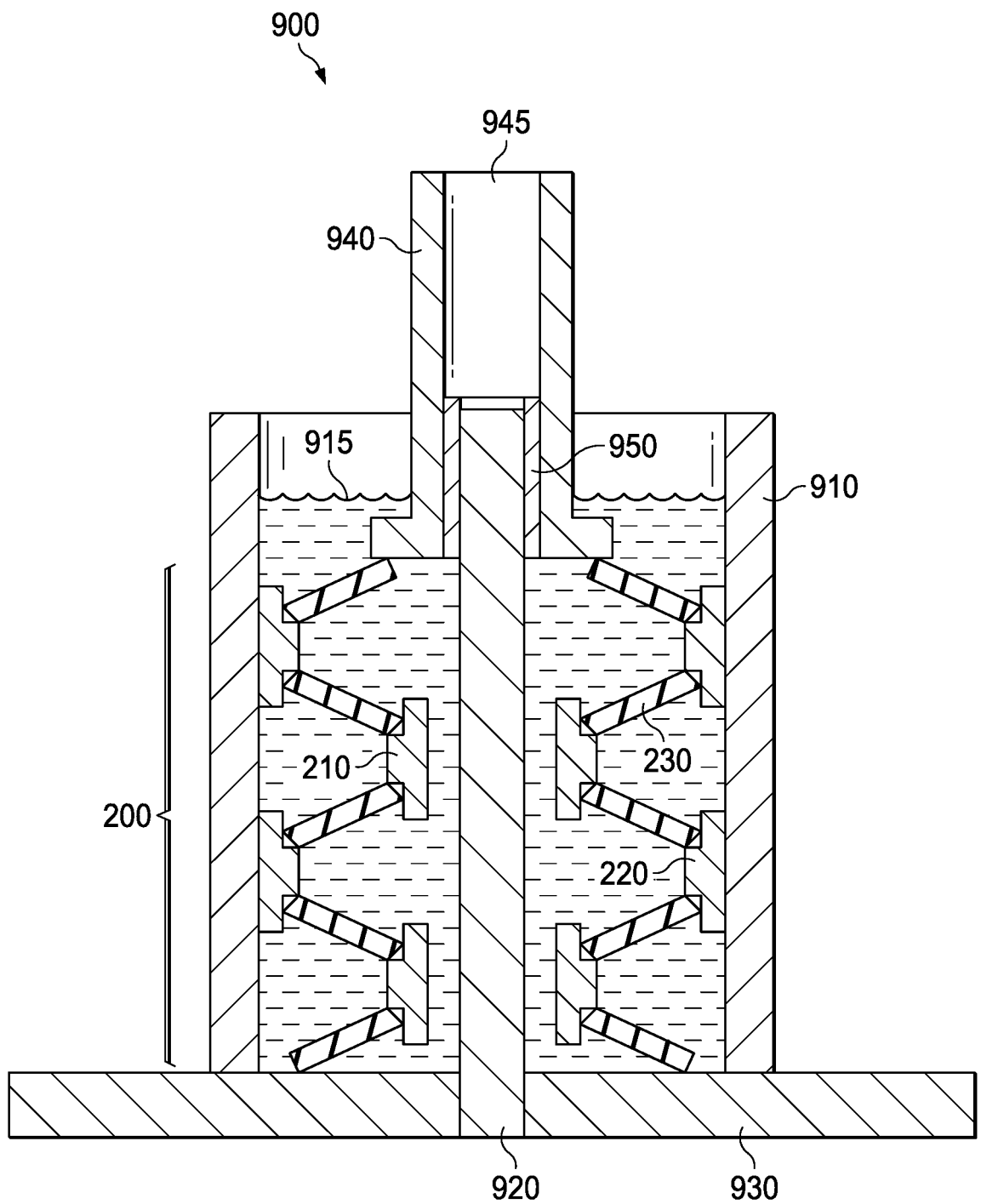
FIG. 9 is a side cross-sectional view of a QZS vibration isolator with increased lateral load capacity, in accordance with at least one embodiment of the present disclosure.

FIG. 9 is a side cross-sectional view of a QZS vibration isolator 900 with increased lateral load capacity, in accordance with at least one embodiment of the present disclosure. Like the QZS vibration isolator 200 shown in FIGS. 2B and 2C, the QZS vibration isolator 900 includes stacked disks or disk spring washers 230, inner spacers 210, and outer spacers 220. It can therefore be said that the QZS vibration isolator 900 includes or is a superset of a QZS vibration isolator 200 or spring stack 200. The QZS vibration isolator 900 also includes a tubular enclosure 910 which surrounds the outer spacers 220 and allows the outer spacers 220 to travel up and down. In some embodiments, the tubular enclosure 910 is a rigid tube with a smooth or smoothed inner surface (e.g., machined to a certain level of smoothness) that permits low-friction vertical travel of the outer spacers 220 while the outer spacers 220 are in contact with the inner wall of the tubular enclosure 910. In other embodiments, the tubular enclosure is a flexible material such as a shrink-fit polymer, that either permits vertical travel of the outer spacers 220 within the tubular enclosure 910 or else permits portions of the tubular enclosure 910 to travel vertically in contact with the outer spacers. In some embodiments, the tubular enclosure 910 may be filled with a viscous fluid 915 to tune the characteristics of a force/deflection curve of the QZS vibration isolator 900.

The QZS isolator 900 also includes a plunger 940 that travels vertically to compress or uncompress the spring stack 200. The plunger is tubular, and its horizontal travel is restricted by a cylindrical shaft 920 running through its central lumen 945. The shaft 920 is fixedly coupled to a base plate or base platform 930. In some embodiments, the shaft is rigid, and prevents lateral movement, bending, or buckling of the spring stack 200. In other embodiments, the shaft is flexible. The plunger 940 travels vertically along the shaft 920 by means of a bushing or linear bearing 950.

In combination, the tubular enclosure 910, shaft 920, and base plate 930 provide increased lateral load capacity for the QZS isolator 900 as compared with the spring stack 200 alone. The disk spring washers are made of a flexible, elastic material, and change shape when compressed, and are capable of spontaneously returning to their original shape after compression forces are released. Any of the tubular enclosure 910, shaft 920, base plate 930, or spacers 210 and 220 may be made of rigid materials such as metal or ceramic, semi-rigid materials such as wood, plastic, or fiberglass, or flexible materials such as polymer film or rubber. The uppermost disk spring washer 230, or an inner or outer spacer coupled thereto, may or may not be coupled to the plunger 940. The lowermost disk spring washer 230, or an inner or outer spacer coupled thereto, may or may not be coupled to the base plate 930. The base plate 930 is configured to support the spring stack 200, tubular housing 910, and shaft 920.

Figure 10:
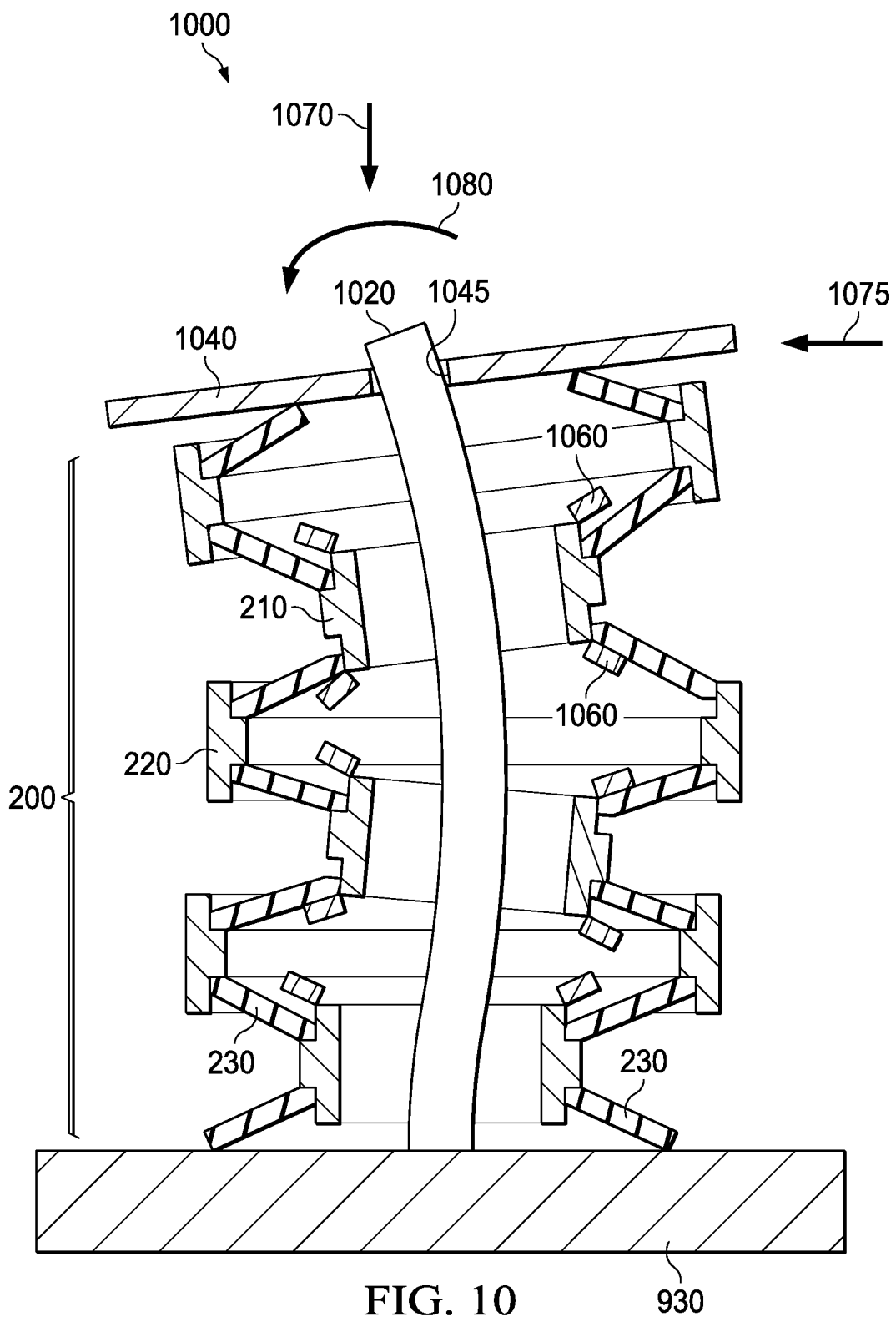
FIG. 10 is a side cross-sectional view of a QZS vibration isolator with increased lateral load capacity, in accordance with at least one embodiment of the present disclosure.

FIG. 10 is a side cross-sectional view of a QZS vibration isolator 1000 with increased lateral load capacity, in accordance with at least one embodiment of the present disclosure. As with the QZS vibration isolator 900 of FIG. 9, the QZS vibration isolator 1000 includes stacked disks or disk spring washers 230, inner spacers 210, and outer spacers 220, comprising a spring stack 200 which is equivalent to the QZS vibration isolator 200 shown in FIGS. 2B and 2C. The QZS vibration isolator 1000 also includes a flexible central shaft 1020 fixedly coupled to a base plate 930. In place of a plunger 940, the QZS vibration isolator 1000 includes a load support plate or load support platform 1040 that travels vertically to compress or uncompress the spring stack 200. To accommodate the shaft 1020, the load support platform 1040 includes an opening 1045 through which the shaft 1020 passes.

The load support platform 1040 may for example be fixedly coupled to the frame of a vehicle seat, or to the slide rails of the seat. The QZS vibration isolator 1000 is configured to receive vertical forces 1070, lateral forces 1075, and torque or bending forces 1080 on the load support platform 1040 and/or the base plate 930. The flexible shaft 1020 is configured to bend in response to lateral forces 1075 or torque/bending forces 1080, while nevertheless restricting lateral movement of the inner spacers 210 away from the flexible shaft 1020. To assist with retention of the disk spring washers 230 against the inner spacers 210, each inner spacer 210 includes tabs 1060 positioned on either or both of the upper side and lower side of the spacer's outer edge. In an example, each spacer includes two upper tabs 1060 circumferentially located 180 degrees apart from one another, and two lower tabs 1060 circumferentially located 180 degrees apart from one another. Other numbers of tabs 1060 may be used instead or in addition, including tabs 1060 spaced symmetrically or asymmetrically from one another. In some embodiments, the tabs 1060 may be ring-shaped and may completely encircle the inner spacer 210.

The base plate 930, flexible shaft 1020, load support platform 1040, and tabs 1060 provide improved lateral support and improved lateral force capacity to the QZS vibration isolator 1000 as compared with the simple spring stack QZS vibration isolator 200 shown in FIGS. 2B and 2C. As a result, when subjected to lateral forces 1075 or torque/bending forces 1080, the QZS vibration isolator has less tendency to buckle or collapse. In addition, the QZS vibration isolator 1000 may provide a greater ability to dampen or isolate lateral vibrations, as compared with the QZS isolator 900 of FIG. 9.

The base plate 930 and load support platform 1040 may be made of rigid materials such as metals or ceramic, or of moderately flexible materials such as wood, plastic, or fiberglass. The shaft 1020 may be made of highly flexible or elastic materials such as rubber, or of less flexible materials such as wood, plastic or fiberglass. The uppermost disk spring washer 230 may or may not be coupled to the load support platform 1040, and the lowermost disk spring washer 230 may or may not be coupled to the base plate 930. The load support platform 1040 may in some cases be replaced with a plunger 940, either of which may be, may include, or may be coupled to a top attachment portion by which the QZS vibration isolator may be attached to another object, such as a vehicle seat. The base plate 930 may be, may include, or may be coupled to a bottom attachment portion by which the QZS vibration isolator may be attached to another object, such as a vehicle floor. In some embodiments, at least some inner spacers and/or t least some outer spacers may be flexible, or may include flexible portions.

Figure 11:
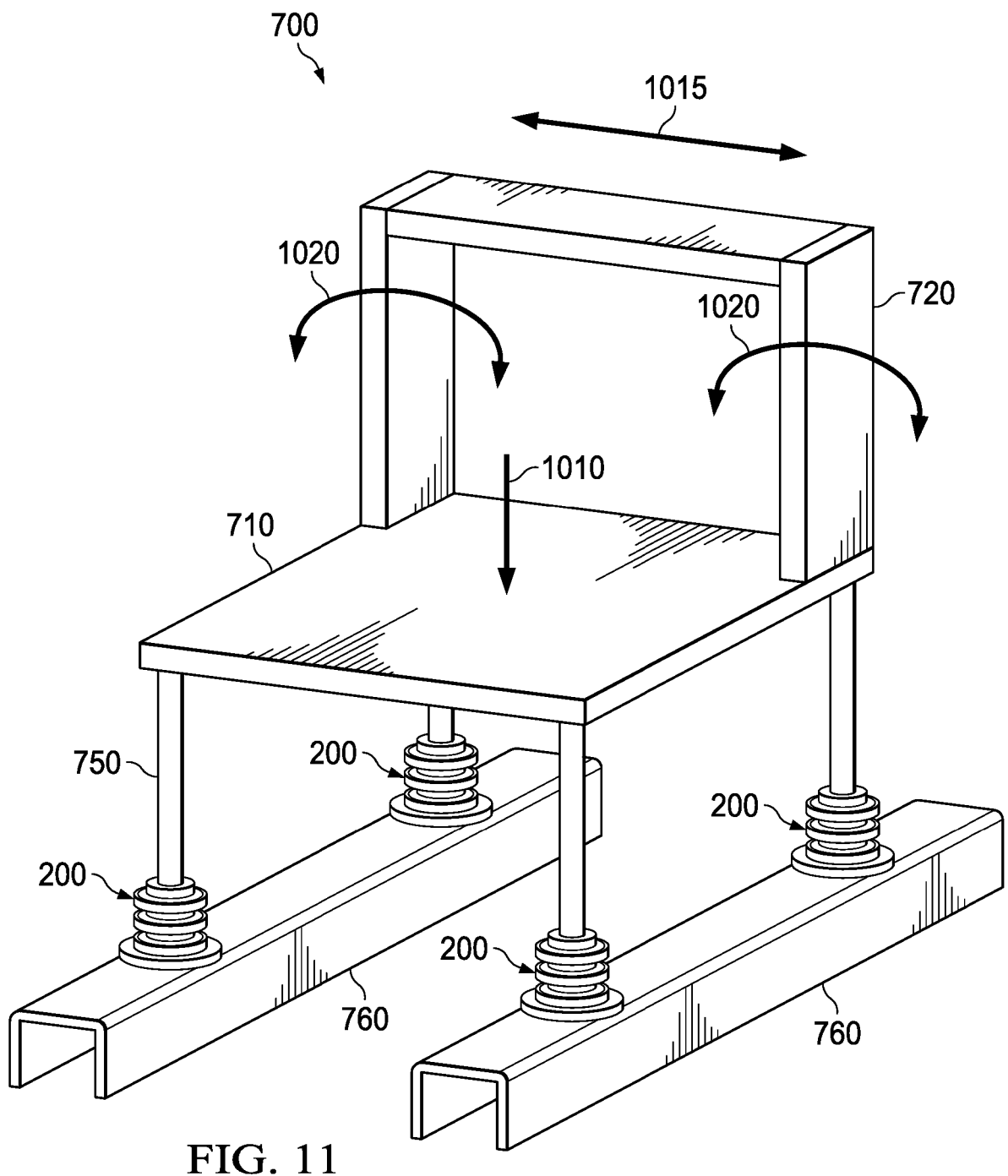
FIG. 11 is a perspective view of a vehicle seat, in accordance with aspects of the present disclosure.

FIG. 11 is a perspective view of a vehicle seat 700, in accordance with aspects of the present disclosure. Visible are the seat pan 710, seat back 720, seat frame 750, slide rails 760, and QZS vibration isolators 200. Also visible is a vertical force 1010, a lateral force 1015, and torque forces 1020. In the non-limiting example of FIG. 11, the vibration isolators 200 are located between the seat frame 750 and the slide rails 760. Other positions for the vibration isolators 200 may be used instead or in addition.

Figure 12:
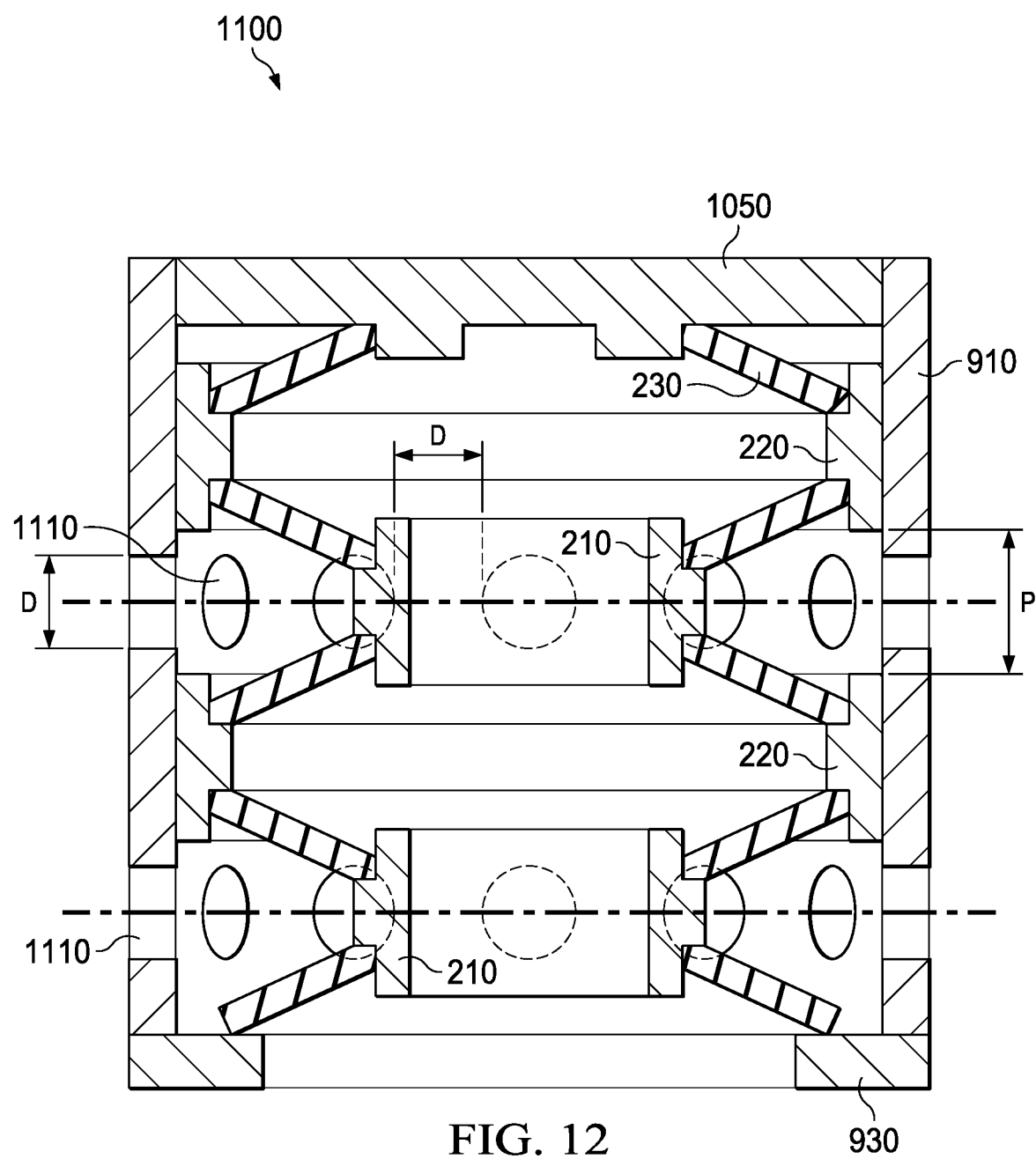
FIG. 12 is a side cross-sectional view of a QZS vibration isolator with increased lateral load capacity, in accordance with at least one embodiment of the present disclosure.

FIG. 12 is a side cross-sectional view of a QZS vibration isolator 1100 with increased lateral load capacity, in accordance with at least one embodiment of the present disclosure. The QZS vibration isolator 900 includes stacked disks or disk spring washers 230, inner spacers 210, and outer spacers 220. It can therefore be said that the QZS vibration isolator 900 includes or is a superset of a QZS vibration isolator 200 or spring stack 200. The QZS vibration isolator 1100 also includes a load support platform 1040 and a base plate 930, along with a tubular enclosure 910 that surrounds the outer spacers 220 and allows the outer spacers 220 to travel up and down. In the non-limiting example of FIG. 12, the tubular enclosure 910 is a shrink-fit polymer that is shown in its non-shrunk state. Once shrunk, the tubular enclosure 910 contacts the outer spacers 220, creating a friction fit that permits portions of the tubular enclosure 910 to travel vertically in contact with the outer spacers 220. In some embodiments, the tubular enclosure includes a plurality of holes 1110 to permit air to escape from the tubular enclosure when the spring stack 200 is compressed.

In an example, the holes 1110 are vertically aligned with the inner spacers 910 have a diameter D and are also spaced apart by the same distance D, where D is 0.8 times the spacing P between outer spacers 220. The shrink fit polymer may for example be a polyolefin plastic with a shrink temperature of 250° F., a shrink ratio of 2:1, and a minimum wall thickness after shrinking of 0.05".

As will be readily appreciated by those having ordinary skill in the art after becoming familiar with the teachings herein, the stacked disk vibration isolator of the present disclosure advantageously provides a capability to isolate or dampen vibrations more effectively than a linear spring vibration isolator, while providing greater lateral force capacity than a simple spring stack QZS vibration isolator without the novel features disclosed herein.

It should be noted that the examples described above are provided for purposes of illustration, and are not intended to be limiting. Other devices and/or device configurations may be utilized to carry out the operations described herein. A number of variations are possible on the examples and embodiments described above. Depending on the implementation, the positions or orientations may be different than shown herein. For example, although components of the QZS vibration isolator may be shown or described herein as circular, conical, or cylindrical, other shapes with non-circular (e.g., elliptical, polygonal, etc.) cross-sections may be used instead or in addition, for one or more components. The technology described herein may be used in vehicles of other types, including campers, mobile homes, commercial towing vehicles, motorcycles, off-road vehicles, aircraft, and watercraft. The exact configuration of the QZS vibration isolator may be selected to optimize performance for the vibration frequencies and amplitudes expected for such vehicles. The QZS isolator may be used for vibration isolation between fixed vehicle components and other vehicle components, including but not limited to seats, engines, engine components, batteries, cargo holds, cargo platforms, wheels, bumpers, and luggage racks.

Accordingly, the logical operations making up the embodiments of the technology described herein are referred to variously as operations, steps, objects, elements, components, or modules. Furthermore, it should be understood that these may be arranged or performed in any order, unless explicitly claimed otherwise or a specific order is inherently necessitated by the claim language.

All directional references e.g., upper, lower, inner, outer, upward, downward, left, right, lateral, medial, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the stacked disk vibration isolator. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the stacked disk vibration isolator as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. An apparatus comprising:
    a seat comprising a seat frame;
    a slide rail coupled to and parallel to a floor in a direction of desired movement for the seat;
    a vibration isolator comprising:
        at least two disk spring washers, wherein each disk spring washer comprises an inner edge, an outer edge, and a central opening;
        at least one ring-shaped outer spacer, wherein each outer spacer is coupled to the outer edges of one or two disk spring washers of the at least two disk spring washers, such that each disk spring washer of the at least two disk spring washers is coupled to an outer spacer of the at least one ring-shaped outer spacer;
        at least one ring-shaped inner spacer, wherein each inner spacer is coupled to the inner edges of one or two disk spring washers of the at least two disk spring washers;
        a flexible central shaft concentric with the at least two disk spring washers, the at least one outer spacer, and the at least one inner spacer;
        a bottom attachment portion fixedly attached to a lower end of the central shaft and configured to support the at least two disk spring washers; and
        a top attachment portion not attached to the central shaft and configured to slide vertically along the central shaft;
        at least one tab disposed at a top edge or a bottom edge of the at least one inner spacer and configured to retain at least one disk spring washer of the at least two disk spring washers against the at least one inner spacer,
        wherein the top attachment portion is configured to, with an application of a downward force, compress the at least two disk spring washers,
    wherein the slide rail is fixedly attached to the floor,
    wherein the vibration isolator is fixedly attached to the seat frame, and
    wherein the vibration isolator is slidably coupled to the slide rail.

2. The apparatus of claim 1, wherein the top attachment portion comprises a plunger, wherein the plunger comprises: a disk-shaped bottom portion of a first diameter, a cylindrical upper portion of a second diameter smaller than the first diameter, and a central lumen running through the disk-shaped bottom portion and the cylindrical upper portion, wherein the central lumen has a third diameter smaller than the second diameter and larger than a diameter of the central shaft.

3. The apparatus of claim 1, wherein the top attachment portion comprises a plate or platform.

4. The apparatus of claim 1, wherein the bottom attachment portion comprises a plate or platform.

5. The apparatus of claim 1, further comprising a tubular enclosure longitudinally aligned with and concentric with the central shaft, wherein the at least two disk spring washers, the at least one inner spacer, and the at least one outer spacer are positioned within the tubular enclosure.

6. The apparatus of claim 5, wherein the tubular enclosure is rigid.

7. The apparatus of claim 5, wherein either the tubular enclosure is flexible, at least one inner spacer is flexible, or at least one outer spacer is flexible.

8. The apparatus of claim 5, further comprising a fluid encapsulated within the tubular enclosure.

9. A vehicle, comprising:
    a floor;
    a seat comprising;
        a backrest;
        a cushion;
        a seat frame;
    a slide rail coupled to and parallel to the floor in a direction of desired movement for the seat;
    a vibration isolator comprising:
        at least two disk spring washers, wherein each disk spring washer comprises an inner edge, an outer edge, and a central opening;
        at least one ring-shaped outer spacer, wherein each outer spacer is coupled to the outer edges of one or two disk spring washers of the at least two disk spring washers, such that each disk spring washer of the at least two disk spring washers is coupled to an outer spacer of the at least one ring-shaped outer spacer;
        at least one ring-shaped inner spacer, wherein each inner spacer is coupled to the inner edges of one or two disk spring washers of the at least two disk spring washers;

a flexible central shaft concentric with the at least two disk spring washers, the at least one outer spacer, and the at least one inner spacer;

a bottom attachment portion fixedly attached to a lower end of the flexible central shaft and configured to support the at least two disk spring washers; and a top attachment portion not attached to the central shaft and configured to slide along the flexible central shaft, wherein the top attachment portion is configured to, with an application of a downward force, reversibly compress the at least two disk spring washers, wherein the vibration isolator is positioned between the slide rail and the seat frame, wherein the slide rail is fixedly attached to the floor, wherein the vibration isolator is fixedly attached to the seat frame, and wherein the vibration isolator is slidably coupled to the slide rail.

10. A vehicle, comprising:
a floor;
a seat comprising;
a backrest;
a cushion;
a seat frame;
a slide rail coupled to and parallel to the floor in a direction of desired movement for the seat;
a vibration isolator comprising:
at least two disk spring washers, wherein each disk spring washer comprises an inner edge, an outer edge, and a central opening;
at least one ring-shaped outer spacer, wherein each outer spacer is coupled to the outer edges of one or two disk spring washers of the at least two disk spring washers, such that each disk spring washer of the at least two disk spring washers is coupled to an outer spacer of the at least one ring-shaped outer spacer;
at least one ring-shaped inner spacer, wherein each inner spacer is coupled to the inner edges of one or two disk spring washers of the at least two disk spring washers;
a flexible central shaft concentric with the at least two disk spring washers, the at least one outer spacer, and the at least one inner spacer;
a bottom attachment portion fixedly attached to a lower end of the flexible central shaft and configured to support the at least two disk spring washers; and
a top attachment portion not attached to the central shaft and configured to slide along the flexible central shaft,
wherein the top attachment portion is configured to, with an application of a downward force, reversibly compress the at least two disk spring washers,
wherein the vibration isolator is positioned between the slide rail and the floor,
wherein the vibration isolator is fixedly attached to the slide rail and the floor, and wherein the seat frame is slidably coupled to the slide rail.

11. The vehicle of claim 9, wherein the top attachment portion comprises a plunger, wherein the plunger comprises: a disk-shaped bottom portion of a first diameter, a cylindrical upper portion of a second diameter smaller than the first diameter, and a central lumen running through the disk-shaped bottom portion and the cylindrical upper portion, wherein the central lumen has a third diameter smaller than the second diameter and larger than a diameter of the central shaft.

12. The vehicle of claim 9, wherein the top attachment portion or bottom attachment portion comprises a plate or platform.

13. The vehicle of claim 9, wherein the vibration isolator further comprises a rigid or flexible tubular enclosure longitudinally aligned with and concentric with the central shaft, wherein the at least two disk spring washers, the at least one inner spacer, and the at least one outer spacer are positioned within the tubular housing.

14. The vehicle of claim 13, wherein at least one inner spacer is flexible, at least one outer spacer is flexible, or a fluid is encapsulated within the tubular enclosure.

15. The vehicle of claim 10, wherein the top attachment portion comprises a plunger, wherein the plunger comprises: a disk-shaped bottom portion of a first diameter, a cylindrical upper portion of a second diameter smaller than the first diameter, and a central lumen running through the disk-shaped bottom portion and the cylindrical upper portion, wherein the central lumen has a third diameter smaller than the second diameter and larger than a diameter of the central shaft.

16. The vehicle of claim 10, wherein the top attachment portion or bottom attachment portion comprises a plate or platform.

17. The vehicle of claim 10, wherein the vibration isolator further comprises a rigid or flexible tubular enclosure longitudinally aligned with and concentric with the central shaft, wherein the at least two disk spring washers, the at least one inner spacer, and the at least one outer spacer are positioned within the tubular housing.

18. The vehicle of claim 17, wherein at least one inner spacer is flexible, at least one outer spacer is flexible, or a fluid is encapsulated within the tubular enclosure.

19. An apparatus comprising:
a seat comprising;
a seat frame;
a slide rail coupled to and parallel to a floor in a direction of desired movement for the seat;
a vibration isolator comprising:
at least two disk spring washers, wherein each disk spring washer comprises an inner edge, an outer edge, and a central opening;
at least one ring-shaped outer spacer, wherein each outer spacer is coupled to the outer edges of one or two disk spring washers of the at least two disk spring washers, such that each disk spring washer of the at least two disk spring washers is coupled to an outer spacer of the at least one ring-shaped outer spacer;
at least one ring-shaped inner spacer, wherein each inner spacer is coupled to the inner edges of one or two disk spring washers of the at least two disk spring washers;
a flexible central shaft concentric with the at least two disk spring washers, the at least one outer spacer, and the at least one inner spacer;
a bottom attachment portion fixedly attached to a lower end of the central shaft and configured to support the at least two disk spring washers; and
a top attachment portion not attached to the central shaft and configured to slide vertically along the central shaft;
at least one tab disposed at a top edge or a bottom edge of the at least one inner spacer and configured to retain at least one disk spring washer of the at least two disk spring washers against the at least one inner spacer,
wherein the top attachment portion is configured to, with an application of a downward force, compress the at least two disk spring washers
wherein the vibration isolator is positioned between the slide rail and the floor,
wherein the vibration isolator is fixedly attached to the slide rail and the floor, and
wherein the seat frame is slidably coupled to the slide rail.

20. The apparatus of claim 19, wherein the top attachment portion comprises a plunger, wherein the plunger comprises: a disk-shaped bottom portion of a first diameter, a cylindrical upper portion of a second diameter smaller than the first diameter, and a central lumen running through the disk-shaped bottom portion and the cylindrical upper portion, wherein the central lumen has a third diameter smaller than the second diameter and larger than a diameter of the central shaft.

21. The apparatus of claim 19, wherein the top attachment portion comprises a plate or platform.

22. The apparatus of claim 19, wherein the bottom attachment portion comprises a plate or platform.

23. The apparatus of claim 19, further comprising a tubular enclosure longitudinally aligned with and concentric with the central shaft, wherein the at least two disk spring washers, the at least one inner spacer, and the at least one outer spacer are positioned within the tubular enclosure.

24. The apparatus of claim 23, wherein the tubular enclosure is rigid.

25. The apparatus of claim 23, wherein either the tubular enclosure is flexible, at least one inner spacer is flexible, or at least one outer spacer is flexible.

26. The apparatus of claim 23, further comprising a fluid encapsulated within the tubular enclosure.

* * * * *